US006753668B1

(12) United States Patent
Stewart et al.

(10) Patent No.: US 6,753,668 B1
(45) Date of Patent: Jun. 22, 2004

(54) REDUCED PROFILE DRIVE ASSEMBLY FOR GARAGE DOOR OPERATOR AND METHOD OF ASSEMBLY

(75) Inventors: James Patrick Stewart, San Diego, CA (US); Mark Y. Shin, San Diego, CA (US); Anthony Ramirez, Escondido, CA (US)

(73) Assignee: Linear Corporation, Carlsbad, CA (US)

( * ) Notice: Subject to any disclaimer, the term of this patent is extended or adjusted under 35 U.S.C. 154(b) by 38 days.

(21) Appl. No.: 10/159,690

(22) Filed: May 31, 2002

(51) Int. Cl.[7] .................................................. G05B 5/00

(52) U.S. Cl. ......................... 318/445; 318/18; 318/364; 318/446; 74/479.01; 74/500.5; 74/501.5 R; 74/625; 192/7; 192/150

(58) Field of Search .......................... 318/18, 283, 364, 318/430, 432, 434, 445, 446; 74/479.01, 500.5, 501.5 R, 625; 192/7, 150; 49/26, 28, 139, 199

(56) References Cited

U.S. PATENT DOCUMENTS

| | | | | | |
|---|---|---|---|---|---|
| 3,927,760 | A | | 12/1975 | McCall | |
| 4,311,225 | A | * | 1/1982 | Tsubaki et al. | 192/142 R |
| 4,905,542 | A | | 3/1990 | Burm et al. | |
| 5,085,094 | A | * | 2/1992 | Clawson et al. | 74/424.6 |
| 5,222,403 | A | * | 6/1993 | Angelini et al. | 74/89.12 |
| 5,361,890 | A | | 11/1994 | McDonald et al. | |
| 5,841,253 | A | * | 11/1998 | Fitzgibbon et al. | 318/280 |
| 6,374,543 | B1 | * | 4/2002 | Bishai | 49/199 |

FOREIGN PATENT DOCUMENTS

| | | | | | |
|---|---|---|---|---|---|
| DE | 2274308 | A * | 7/1994 | | E05F/15/16 |
| DE | 0859111 | A2 * | 2/1998 | | E05F/15/16 |
| FR | 2719076 | * | 4/1995 | | E05F/15/16 |

* cited by examiner

*Primary Examiner*—Robert Nappi
*Assistant Examiner*—Tyrone Smith
(74) *Attorney, Agent, or Firm*—Hogan & Hartson, LLP

(57) ABSTRACT

A garage door drive assembly for moving a linkage arm connected to a garage door, the assembly being adapted for shipping in a partially assembled condition in at least a box for on-site installation, the assembly has a longitudinally-extending rail with laterally extending flanges. The assembly also has a carriage shaped to fit about the flanges. A drive mechanism is movably mounted to the rail. An anchor is coupled to the drive mechanism. The assembly also has a coupler with a selectively releasable connection to the anchor, a connector pivotably connectable to the linkage arm, and a detachable connection enabling the coupler to be fixedly secured to and carried by the carriage. The rail and the carriage may be shipped to the installation site in a box having a smaller cross-sectional profile than would be required to accommodate the carriage and coupling in their connected state.

9 Claims, 8 Drawing Sheets

REDUCED PROFILE DRIVE ASSEMBLY FOR GARAGE DOOR OPERATOR AND METHOD OF ASSEMBLY

BACKGROUND OF THE INVENTION

The present invention is directed to electronic garage door openers and, more particularly, to a drive assembly for an electric garage door opener rail.

In the garage door industry, T-rails are shipped in long corrugated cardboard boxes that are approximately 90 to 130 inches long. During shipping, the boxes are frequently damaged and crushed due to excess empty space in the box, which causes handling problems. The shipping survivability of the drive assemblies and boxes can be improved by adding polymer inserts to fill the empty spaces in the box. This is disadvantageous because of the expense of the polymer inserts, the space required for storing bulky packaging components, and the need for disposal of large quantities of non-biodegradeable packaging components. Additionally, drive assemblies are often damaged during shipping, requiring an installer to install a new drive assembly.

Another approach to improve shipping survivability is to design a box that fits tightly with the T-rail to reduce the empty spaces that are vulnerable to crushing. In order to reduce the empty space, because the drive assembly is the largest profile component in the assembly, the drive assembly is removed from the T-rail assembly. Removal of the drive assembly from the T-rail during shipping eliminates drive assembly damage from shipping. However, the disadvantage of this approach is that the installer has to reassemble the drive assembly onto the T-rail at the point of installation. Often, in order to reassemble the drive assembly onto the T-rail, the installer has to disassemble other components, such as the drive mechanism and a pulley. This can be a time consuming, confusing and frustrating procedure. Installers are often paid on a piece-meal basis per installation, so lost time can be costly for the installer.

SUMMARY OF THE INVENTION

The present invention is directed to a garage door drive assembly for moving a linkage arm connected to a garage door to raise and lower the garage door. The assembly is adapted for shipping in a partially assembled condition in at least one box for on-site installation. The assembly, according to an exemplary embodiment of the present invention, includes a longitudinally-extending rail having laterally extending flanges extending therefrom. The assembly also includes a carriage shaped to fit about the flanges thereby supporting the carriage for sliding motion along the rail. A drive mechanism is movably mounted to the rail for longitudinal motion along the rail. An anchor is coupled to the drive mechanism for movement with the drive mechanism. The assembly also includes a coupler.

The coupler has a selectively releasable connection to the anchor, a connector pivotably connectable to the linkage arm, and a detachable connection enabling the coupler to be fixedly secured to and carried by the carriage. The rail and the carriage may be shipped to the installation site in a box having a smaller cross-sectional profile than would be required to accommodate the carriage and the coupler in their connected state.

In an embodiment, the anchor has a first half and a second half. The second half is coupled to the first half using at least one fastener passing through the drive mechanism. The first half and the second half of the anchor form a locking notch. The coupler has a locking tab moveably engageable into the locking notch. Additionally, a spring and a lever are coupled to the locking tab. The lever engages and disengages the locking tab from the locking notch. In an additional embodiment, the lever has a detent at one end, the detent engaging with the coupler to prevent the locking tab from engaging in the locking notch.

In an embodiment, the carriage has a retainer, and the coupler has both a mounting base and a plurality of retention brackets. The anchor is prevented from disengaging from the locking tab by the retainer, the mounting base, and the retention brackets.

The connector pivotably connectable to the linkage arm has a bracket with a fastener opening. In an exemplary embodiment, the bracket has two bracket arms, each of which has a fastener opening. The linkage arm has an orifice to facilitate attachment to the bracket. The linkage arm is inserted between the two bracket arms and a fastener is passed through the fastener openings and the orifice.

In an exemplary embodiment, the detachable connection of the coupler to the carriage includes a biased clip connected to the coupler, the biased clip having a hook; and a clip opening in the carriage. The clip opening is positioned so that the hook is inserted into the clip opening upon proper engagement between the carriage and the coupler. Additionally, the detachable connection includes a plurality of coupler insertion openings extending laterally across the carriage and a plurality of inserts extending laterally across the coupler. The inserts are insertable into the plurality of insertion openings.

BRIEF DESCRIPTION OF THE DRAWINGS

Other features and advantages of the present invention will become apparent from the following detailed description, taken in conjunction with the accompanying drawings, in which.

DETAILED DESCRIPTION

Figure 1:
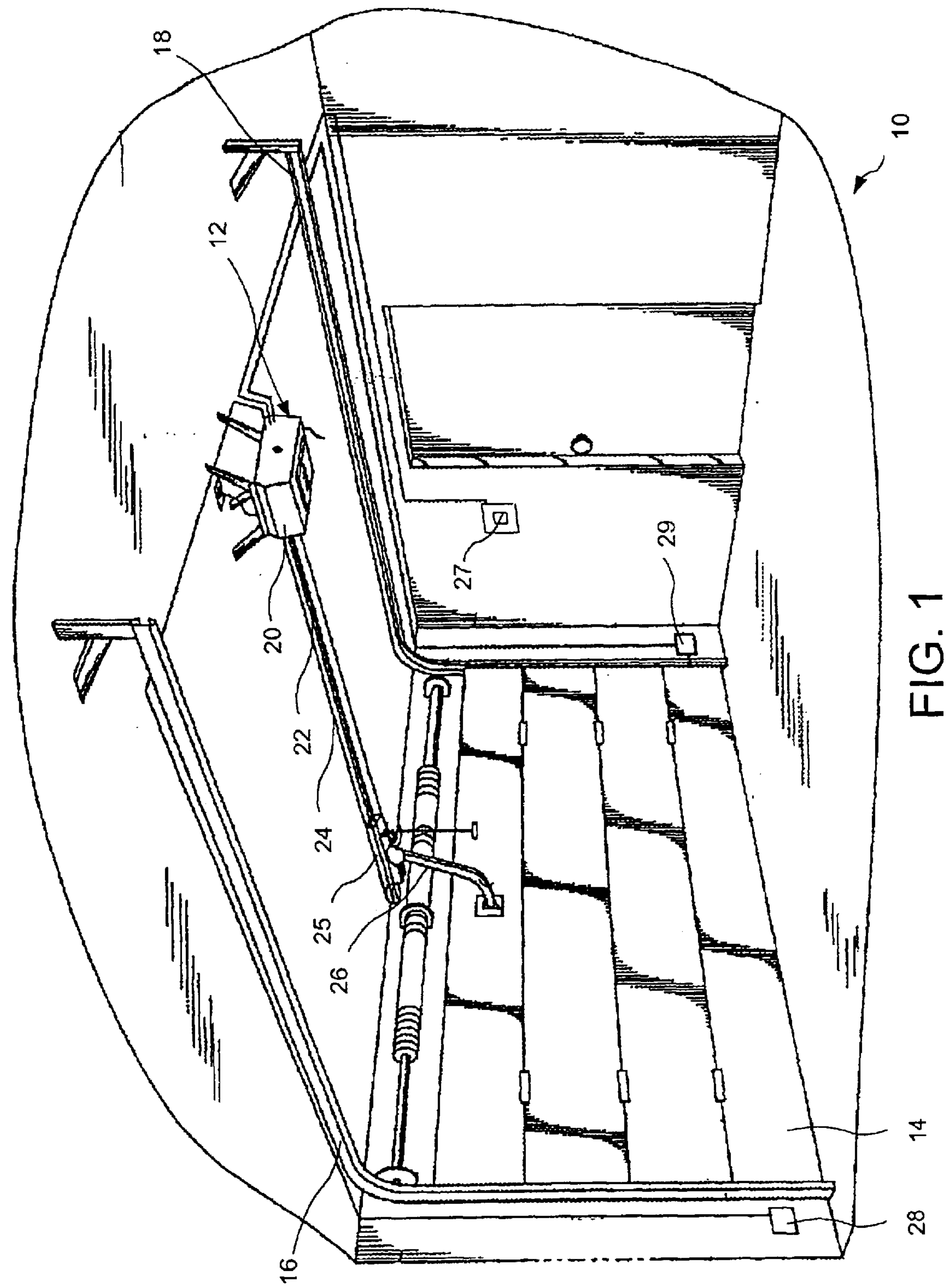
FIG. 1 is a perspective view of an interior of a garage showing a garage door and an electronic garage door opening system.

As shown in FIG. 1, a garage door opener system 10 has a garage door opener 12 coupled to a garage door 14. An exemplary garage door 14 is sectional and is mounted for travel on a pair of rails 16, 18. The garage door opener has a drive unit 20 coupled to a drive mechanism. In an exemplary embodiment, the drive mechanism is a chain 22. The chain 22 extends along a T-rail 24 mounted from the drive unit 20 and extending longitudinally to a point above the garage door. The T-rail has laterally extending flanges. A drive assembly 25 is releasably coupled to the chain 22. The chain 22 is driven by the drive unit, and the drive assembly 25 is driven along the T-rail 24 by the chain 22. A linkage arm 26 is coupled to the drive assembly 25 and to the garage door 14. As the drive assembly 25 is driven along the T-rail 24, the arm 26 causes the garage door 14 to be raised or lowered. A switch 27 activates the drive unit 20. A safety beam emitter 28 and a safety beam receiver 29 are electrically coupled to the drive unit 20 and may stop the drive unit 20 to prevent the garage door 14 from closing on an obstruction.

Figure 2:
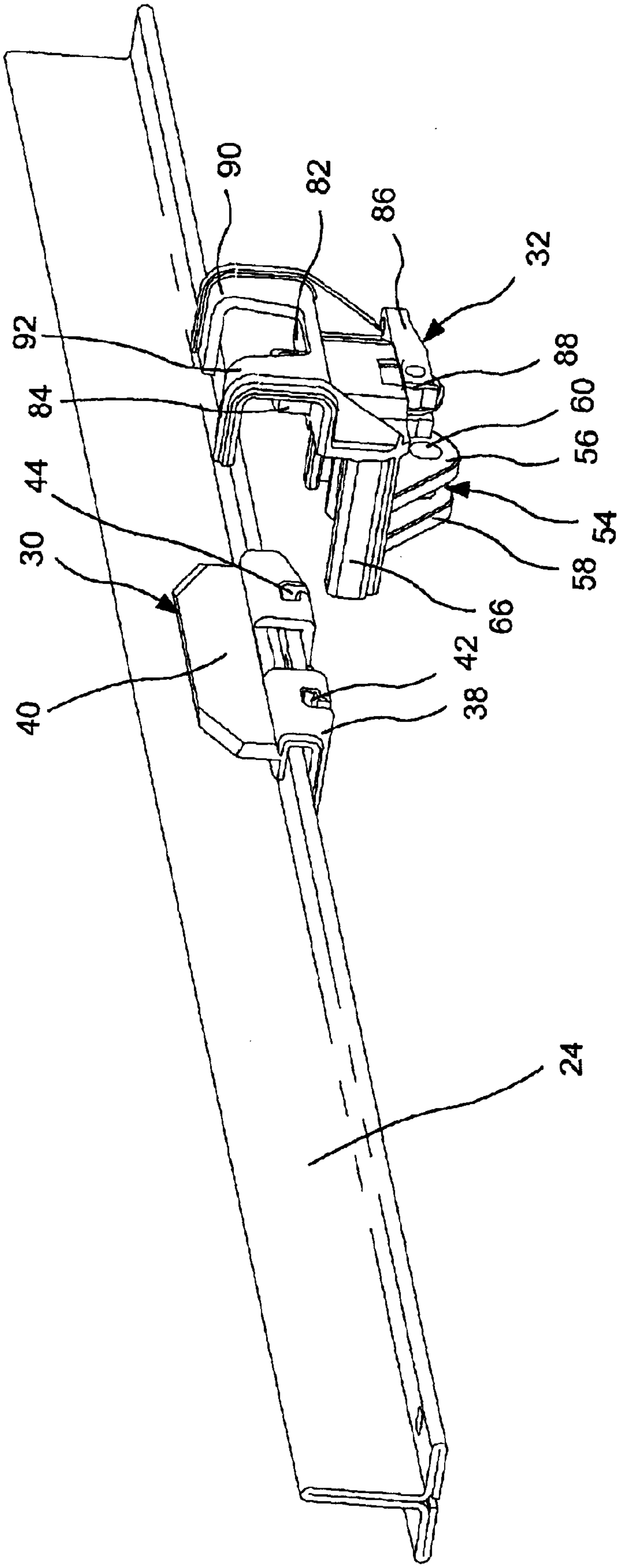
FIG. 2 is a perspective view of a carriage coupled to a T-rail with the coupler oriented for insertion into the carriage according to an exemplary embodiment of the present invention.

As shown in FIG. 2, a drive assembly according to an exemplary embodiment of the present invention consists of two pieces, a carriage 30 and a coupler 32. The carriage 30 and the coupler 32 are releasably coupled together. The carriage 30 rides on the T-rail 24.

Figure 3:
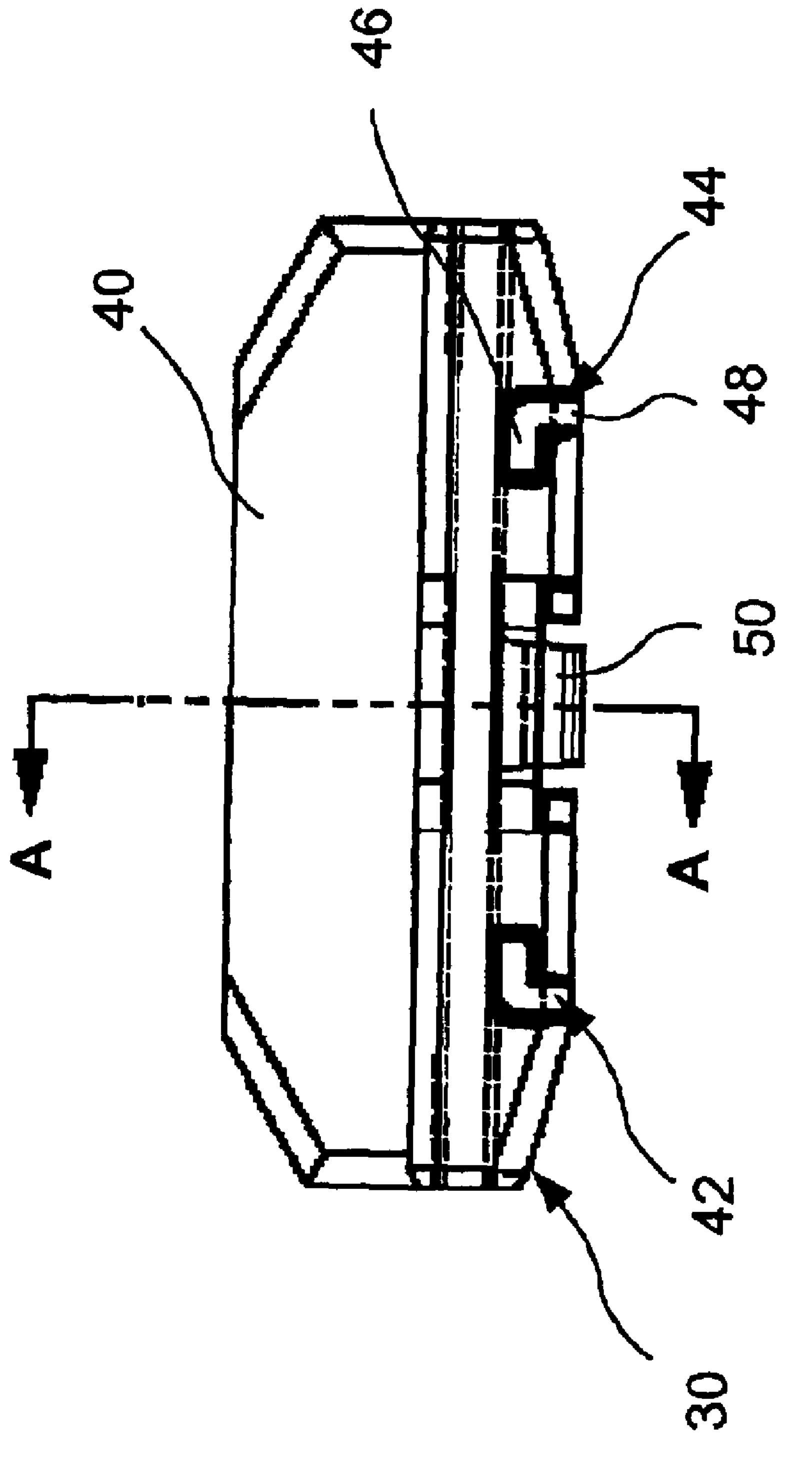
FIG. 3 is a side view of a carriage according to an exemplary embodiment of the present invention.
Figure 4:
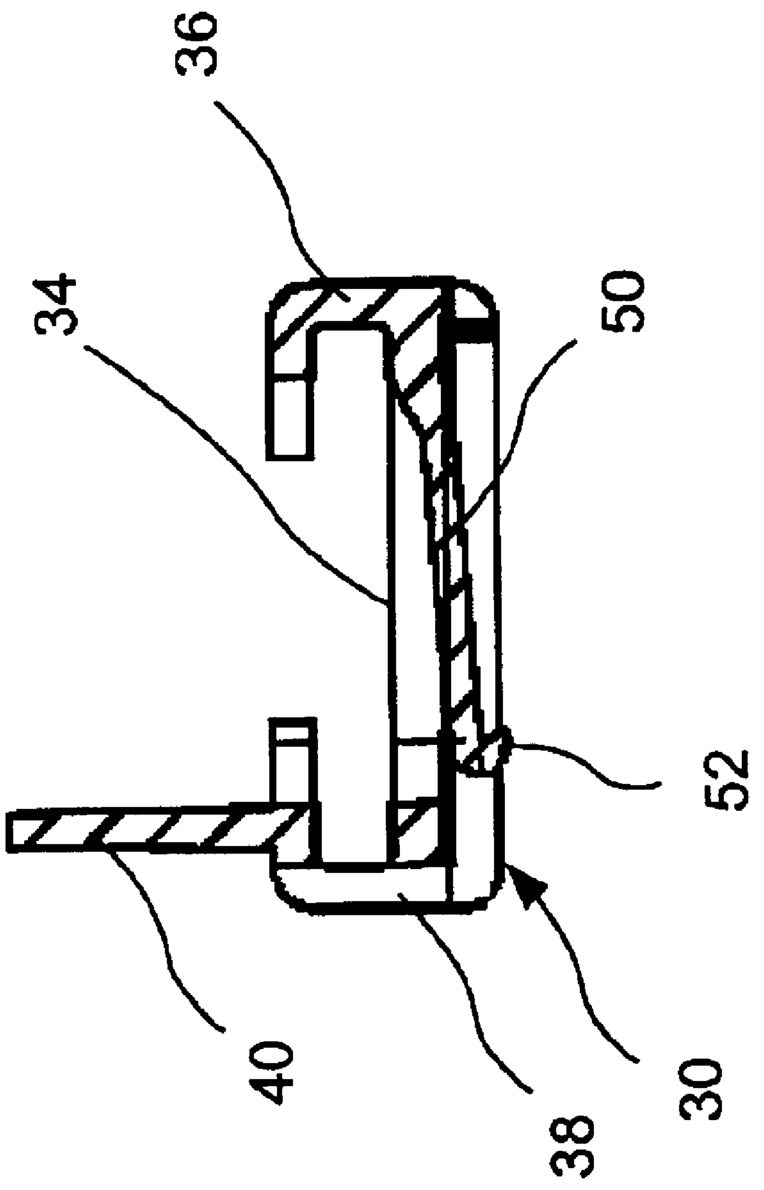
FIG. 4 is a cross-sectional view of a carriage according to an exemplary embodiment of the present invention taken along line A—A of FIG. 3.
Figure 5:
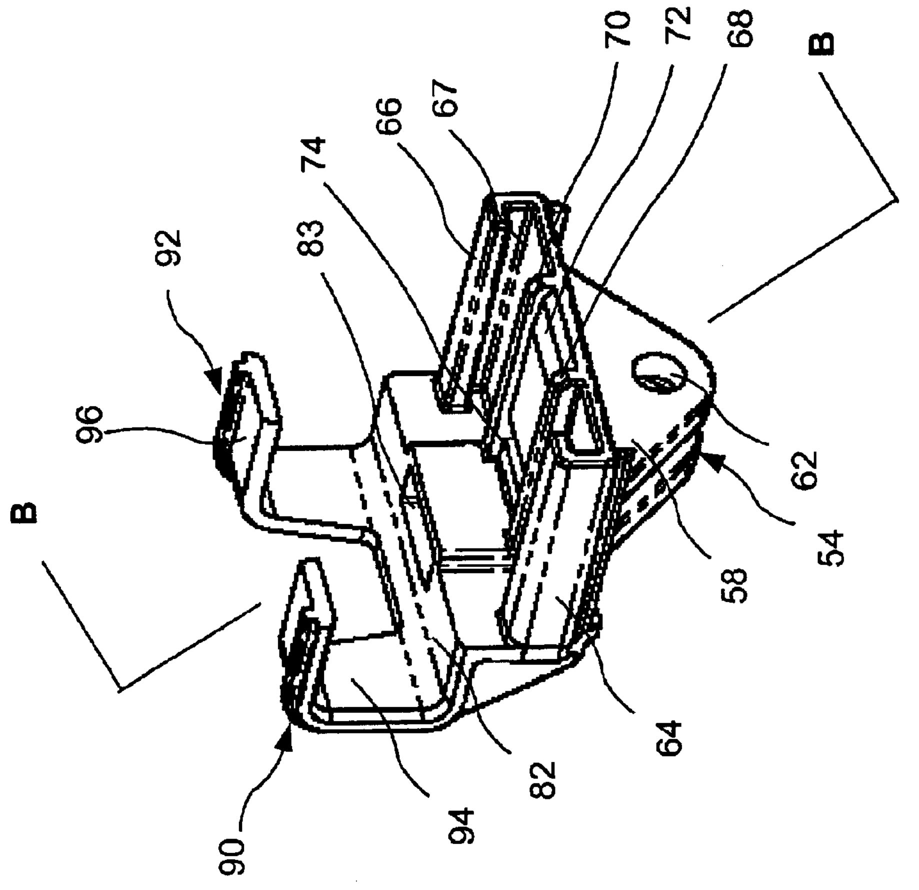
FIG. 5 is a perspective view of a coupler according to an exemplary embodiment of the present invention.
Figure 6:
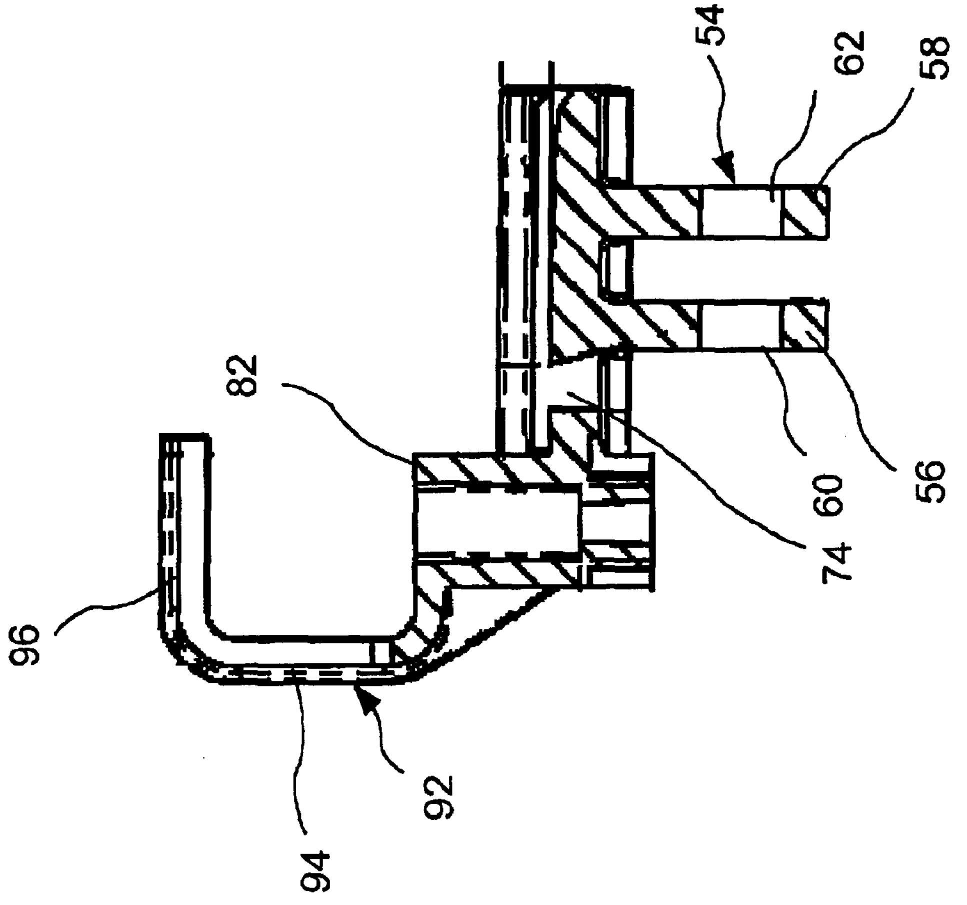
FIG. 6 is a cross-sectional view of a coupler according to an exemplary embodiment of the present invention taken along line B—B of FIG. 5.

The carriage 30 has a length extending along the longitudinal axis of the T-rail and a width extending along a lateral axis of the T-rail. As shown in FIGS. 3 and 4, the carriage has a horizontal web 34. The horizontal web 34 terminates in two C-shaped brackets 36, 38 extending along the length of the horizontal web 34. The horizontal web 34 and the C-shaped brackets 36, 38 fit around a wide part of the T-rail 24 and hold the carriage 30 onto the T-rail 24. A chain anchor retainer 40 extends vertically from the C-shaped bracket 38 on the side of the T-rail where the coupler 32 is attached. The chain anchor retainer 40 extends along the length of the carriage.

The horizontal web 34 has a thickness. As shown in FIGS. 2 and 4, portions of the horizontal web 34 are cut away to create two coupler insertion openings 42, 44 extending across the width of the horizontal web 34. In an embodiment, the coupler insertion openings 42, 44 are elbow shaped with a horizontal portion 46 adjacent to the horizontal web 34. A vertical portion 48 is in communication with, and extends downward from, the horizontal portion 46. In an exemplary embodiment, the horizontal portion 46 is contiguous with the horizontal web 34.

Additionally, an elastic clip 50 with a downward bias is formed into the bottom of the horizontal web. The clip has horizontal portion extending across the width of the carriage. The clip terminates in a downward facing hook 52. The carriage may be made of many different materials, such as injection molded polymer, stamp formed steel, die-cast steel, die-cast aluminum, and die-cast zinc.

The carriage is placed on the T-rail by inserting the carriage over one end of the T-rail so that the C-shaped brackets are placed over the wide part of T-rail. There is no need to remove the carriage from the T-rail for shipping or for garage door installation.

As shown in FIGS. 2 and 5 to 7, the coupler 32 has a length extending along the longitudinal axis of the T-rail, a width extending along a lateral axis of the T-rail, and a vertical axis perpendicular to both the length and the width. The coupler 32 has three different portions. To describe the coupler it is helpful to describe an exemplary embodiment along the vertical axis from the bottom up. However, it will be readily understood by one skilled in the art, that the vertical order and orientation of the described features may be rearranged.

A first portion of the coupler 32 engages with the garage door linkage arm 26. To engage with the linkage arm 26, a bottom surface of the coupler is formed with a vertically oriented bracket 54. The bracket 54 has two bracket arms 56, 58. The arms 56, 58 contains fastener openings 60, 62. A portion of the linkage arm 26 has a hole with a diameter corresponding to the diameter of the fastener openings 60, 62. The linkage arm is inserted between the two bracket arms 56, 58 and the hole in the linkage arm is aligned with the two fastener openings 60, 62. A fastener is inserted through both fastener openings 60, 62 and through the hole in the linkage arm to attach the linkage arm to the coupler. In an embodiment, the fastener is a carriage bolt with a retaining pin.

A second portion of the coupler engages with the carriage. In an exemplary embodiment, the portion that engages with the carriage is formed above the portion that engages with the garage door arm 26. Two elbow shaped inserts 64, 66, corresponding to the coupler insertion openings 42, 44 of the carriage, are formed across the width of the coupler with a horizontal web between. Two ribs 68, 70 extend across the width of the horizontal web. Between the two ribs 68, 70 is a raised portion 72 over which passes the clip 50 of the carriage.

A clip opening 74 is formed in the raised portion 72. The clip opening is positioned so that when the coupler is completely inserted into the carriage, the downward facing hook 52 of the clip is sprung into the clip opening 74. To disengage the coupler 32 from the carriage 30, a user inserts a tool into the clip opening from a bottom of the coupler and pushes the hook back up over the too of the clip opening 74.

A third portion of the coupler engages with a chain anchor 76. In an exemplary embodiment, the portion that engages with the chain anchor 76 is formed above the portion that engages with the carriage.

Figure 8:
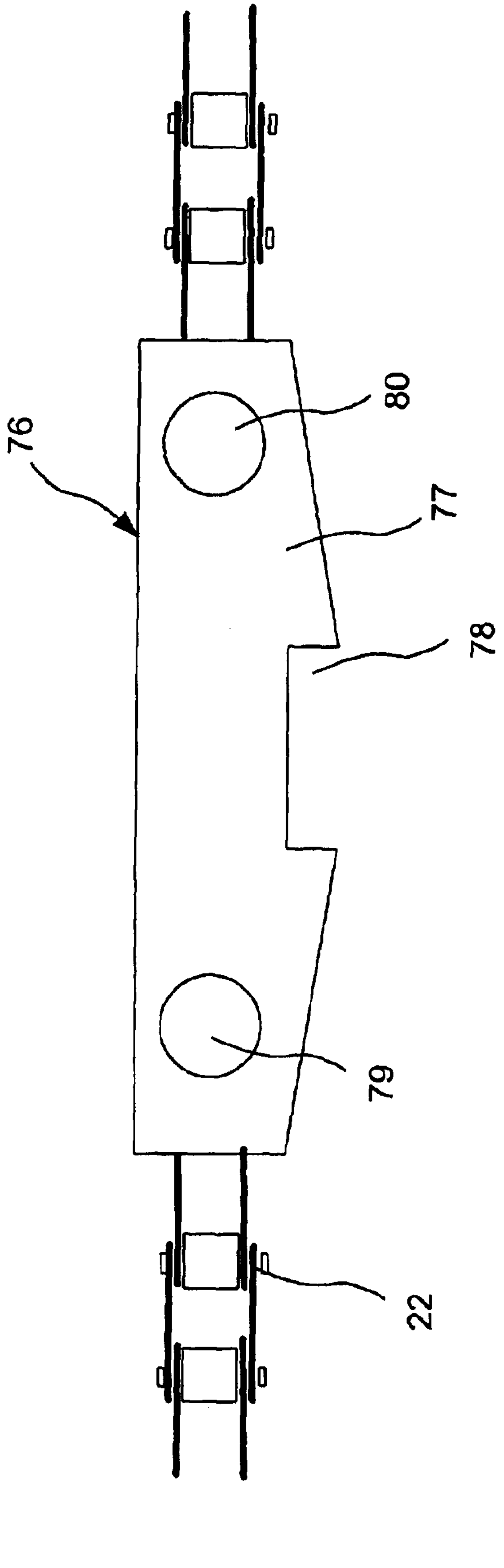
FIG. 8 is a side view of a chain anchor according to an exemplary embodiment of the present invention.

As shown in FIG. 8, the chain anchor 76 is placed on the chain to connect the chain to the coupler. In an exemplary embodiment, the chain anchor 76 has two identical halves 77, although in an alternative embodiment, the chain anchor may be formed as a single piece. A locking notch 78 is formed in the bottom surface of the chain anchor halves. The locking notch 78 allows the anchor to engage a locking tab of the coupler as discussed below. The bottom surface of each anchor half is angled downward from each longitudinal end to an edge of the locking notch 78. Therefore, the bottom surface of the assembled anchor 76 forms a V-shape along a longitudinal axis with the locking notch 78 at the point of the "V".

Each chain anchor half has two fastener holes 79, 80. One chain anchor half is placed on each side of the chain, and the anchor halves are then aligned. A fastener is placed in each fastener hole 79, 80 of one chain anchor half. The fasteners extend through gaps in the links of the chain and out through the fastener holes of the other chain anchor half. The fasteners hold the chain anchor to the chain. Because the fasteners extend through gaps in the links of the chain, the fasteners prevent the chain anchor from moving up or down the length of the chain. In an embodiment, the fasteners are nuts and bolts. In an alternative embodiment, the fasteners are rivets. The chain anchor halves 77 may be made of many different materials, such as injection molded polymer, stamp formed steel, die-cast steel, die-cast aluminum, or die cast-zinc.

Referring again to the coupler, as shown in FIGS. 2 and 5 to 7, A chain anchor mounting base 82 is formed above the second portion of the coupler on the side of the coupler away from the T-rail 24. The chain anchor mounting base 82 has a hole 83 (See FIG. 5) through which is mounted a spring loaded locking tab 84 that engages with the locking notch 78 of the chain anchor 76. A lever 86 coupled to the locking tab 84 is positioned on the underside of the mounting base 82.

In an embodiment, the lever has a bracket formed of two arms. Each arm has a hole. Likewise, the locking tab 84 has a hole for passage of a fastener. A fastener is placed through the holes in the arms of the lever bracket and through the locking tab hole to secure the locking tab to the lever 86. When a free end of the lever 86 is pulled downward, the opposite end contacts a portion of the coupler 32 and acts as a fulcrum. Further downward movement of the free end of the lever pulls the locking tab 84 downward. A rounded detent 88 is formed on one end of the lever 86. When the lever 86 is pulled downward to retract the locking tab 84, the detent prevents the lever from moving upward, and the locking tab 84 from re-engaging with the locking notch 78 of the chain anchor 76.

Figure 7:
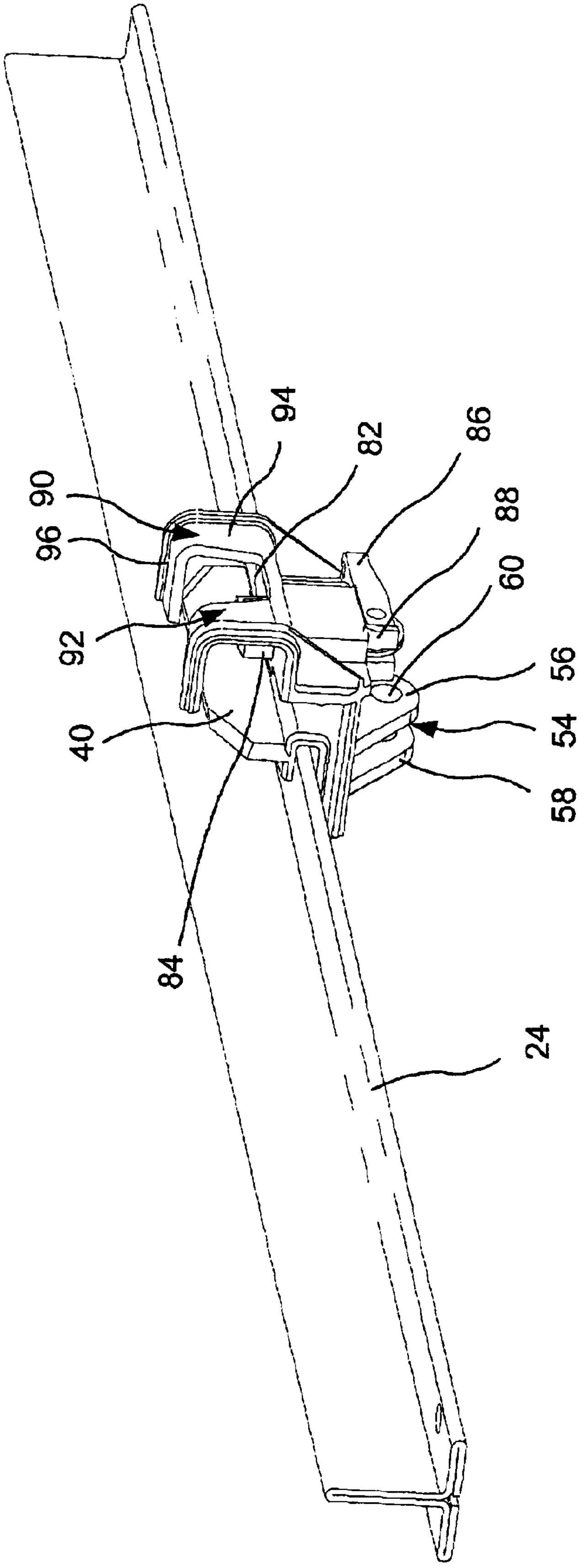
FIG. 7 is a perspective view of a coupler mounted to the carriage which is in turn mounted to the T-rail according to an exemplary embodiment of the present invention.

Two right angled chain anchor retention brackets 90, 92 are formed above the chain anchor mounting base 82. The brackets 90, 92 have a vertical portion 94 and a horizontal portion 96 extending from the vertical portion toward the T-rail 24. As shown in FIG. 7, once the coupler 32 is engaged with the carriage 30, the retention brackets 90, 92 and mounting base 82 of the coupler, and the retainer 40 of the carriage, form a cage surrounding the chain anchor 76. The cage prevents lateral and vertical movement of the anchor relative to the coupler 32.

The coupler may be made of many different materials, such as injection molded polymer, stamp formed steel, die-cast steel, die-cast aluminum, or die cast zinc. Additionally, the carriage and the coupler may be made of two dissimilar materials to improve bearing surfaces. For example, the carriage may be made of low friction material for ease of sliding along the T-rail, while the coupler may be made of a higher strength material for engagement with the chain and the linkage arm.

In order to assemble the drive assembly of the present system, the installer removes the T-rail 24 from a shipping box with the carriage 30 already mounted to the T-rail 24. The installer aligns and inserts the elbow shaped inserts 64, 66 of the coupler into the insertion openings 42, 44 of the carriage until the hook 52 of the clip 50 snaps into the clip opening 74. Once the coupler 30 is snapped into the carriage, the installer moves the now assembled drive assembly 25 along the T-rail 24 until the drive assembly 25 is adjacent to the linkage arm 26 of the garage door.

The installer connects the coupler 30 to the linkage arm 26 by inserting an end of the linkage arm 26 between the two bracket arms 56, 58 and passing a fastener through holes in the two bracket arms 56, 58 and the linkage arm 26. Once connected to the linkage arm 26, the drive assembly 25 is prevented from moving along the T-rail by the weight of the garage door. The drive unit is activated and the chain and the anchor travel along the T-rail until the anchor reaches the drive assembly.

As the drive unit continues to drive the chain and anchor, the anchor enters the cage created by the mounting base 82 and retention brackets 90, 92 of the coupler 32 and the retainer 40 of the carriage. The V-shaped bottom surface of the anchor depresses the locking tab 84 as the anchor 76 moves into the cage. The anchor continues to enter the cage and depress the locking tab until the locking notch 78 is positioned over the locking tab 84, at which time, the locking tab 84 snaps into the locking notch 78.

In additional embodiments, the carriage and coupler are used with a belt, screw, or shaft as the drive mechanism instead of a chain. For example, an anchor may be placed on a belt or a screw to facilitate connection to the coupler. Additionally, the present invention may be used with longitudinally extending support structures other than T-rails with the carriage shape being modified to correspond to the shape of the support structure.

The two piece drive assembly allows the shipping box to fit tightly around the T-rail, without requiring time consuming reassembly by an installer. This is because the carriage remains on the T-rail during shipping. The carriage conforms closely to the shape of the T-rail, and adds very little cross-sectional profile to the assembly.

Additionally, a two-piece drive assembly according to an exemplary embodiment of the present invention is easier to repair than existing systems. If the coupler is damaged, the coupler may simply be snapped off of the carriage and replaced without removing the entire drive assembly from the T-rail.

Although references have been made in the foregoing description to an exemplary embodiment, persons of ordinary skill in the art of designing garage door openers will recognize that insubstantial modifications, alterations, and substitutions can be made to the exemplary embodiment described without departing from the invention as claimed in the accompanying claims.

What is claimed is:

1. A garage door drive assembly for moving a linkage arm connected to a garage door to raise and lower the garage door, the assembly being adapted for shipping in a partially assembled condition in at least a box for on-site installation, the assembly comprising:

- a longitudinally-extending rail having laterally extending flanges extending therefrom;
- a carriage shaped to fit about the flanges thereby supporting the carriage for sliding motion along the rail;
- a drive mechanism movably mounted to the rail for longitudinal motion along the rail;
- an anchor coupled to the drive mechanism for movement with the drive mechanism; and
- a coupler having,
  - a selectively releasable connection to the anchor;
  - a connector pivotably connectable to the linkage arm; and
  - a detachable connection enabling the coupler to be fixedly secured to and carried by the carriage;
- wherein the rail and the carriage may be shipped to the installation site in a box having a smaller cross-sectional profile than would be required to accommodate the carriage and the coupler in their connected state; and
- wherein the detachable connection includes a biased clip connected to the coupler, the biased clip having a hook; and a clip opening in the carriage, the clip opening being positioned so that the hook is inserted into the clip opening upon proper engagement between the carriage and the coupler.

2. The garage door drive assembly of claim 1 further comprising:

- a plurality of coupler insertion openings extending laterally across the carriage; and
- a plurality of inserts extending laterally across the coupler, the inserts being insertable into the plurality of insertion openings.

3. A garage door drive assembly for moving a linkage arm connected to a garage door to raise and lower the garage door, the assembly being adapted for shipping in a partially assembled condition in at least a box for on-site installation, the assembly comprising:

a longitudinally-extending rail having laterally extending flanges extending therefrom;

a carriage shaped to fit about the flanges thereby supporting the carriage for sliding motion along the rail;

a drive mechanism movably mounted to the rail for longitudinal motion along the rail;

an anchor coupled to the drive mechanism for movement with the drive mechanism; and a coupler having, a selectively releasable connection to the anchor;

a connector pivotably connectable to the linkage arm; and a detachable connection enabling the coupler to be fixedly secured to and carried by the carriage;

wherein the rail and the carriage may be shipped to the installation site in a box having a smaller cross-sectional profile than would be required to accommodate the carriage and the coupler in their connected sate;

wherein the anchor has:

a first half; and a second half coupled to the first half using at least one fastener passing through the drive mechanism;

wherein the first half and the second half form a locking notch; and wherein the coupler has a locking tab moveably engageable into the locking notch.

4. The garage door drive assembly of claim 3 wherein: the coupler has:

a spring coupled to the locking tab;

a lever coupled to an end of the locking tab; and the lever engages and disengages the locking tab from the locking notch.

5. The garage door drive assembly of claim 4 wherein the lever has a detent at one end, the detent engaging with the coupler to prevent the locking tab from engaging in the locking notch.

6. The garage door drive assembly of claim 5 wherein:

the carriage has a retainer;

the coupler has a mounting base and a plurality of retention brackets; and the anchor is prevented from disengaging from the locking tab by the retainer, the mounting base, and the retention brackets.

7. A garage door drive assembly for moving a linkage arm connected to a garage door to raise and lower the garage door, the assembly being adapted for shipping in a partially assembled condition in at leas a box for on-site installation, the assembly comprising:

a longitudinally-extending rail having laterally extending flanges extending therefrom;

a carriage shaped to fit about the flanges thereby supporting the carriage for sliding motion along the rail;

a drive mechanism movably mounted to the rail for longitudinal motion along the rail;

an anchor coupled to the drive mechanism for movement with the drive mechanism; and a coupler having:

a selectively releasable connection to the anchor;

a connector pivotably connectable to the linkage arm; and a detachable connection enabling the coupler to be fixedly secured to and carried by the carriage, wherein the rail and the carriage may be shipped to the installation site in a box having a smaller cross-sectional profile than would be required to accommodate the carriage and the coupler in the connected state;

wherein the connector pivotably connectable to the linkage arm further comprises a bracket, the bracket having a fastener opening;

wherein the bracket further comprises two bracket arms, each of the bracket arms having a fastener opening;

wherein the linkage arm has an orifice;

wherein the linkage arm is inserted between the two bracket arms; and wherein a fastener is passed through the fastener openings and the orifice.

8. A method for assembling a garage door drive assembly for moving a linkage arm connected to a garage door to raise and lower the garage door, the assembly having a rail, carriage, coupler, drive mechanism, and anchor, the method comprising:

receiving the carriage coupled to the rail, the anchor coupled to the drive mechanism, and the drive mechanism and anchor moveably coupled to the rail;

attaching the coupler to the carriage; and attaching the coupler to the anchor;

wherein attaching the coupler to the carriage further comprises:

aligning elbow shaped inserts of the coupler with corresponding insertion openings of the carriage; and inserting the elbow shaped inserts of the coupler into the corresponding insertion openings of the carriage until a hook attached to a biased clip on the carriage engages in a clip opening of the coupler.

9. The method for assembling a garage door drive assembly of claim 8 further comprising:

attaching the coupler to the linkage arm of the garage door; and moving the anchor and drive mechanism until the anchor attaches to the coupler.

* * * * *